US006996334B1

(12) United States Patent
Parsons et al.

(10) Patent No.: US 6,996,334 B1
(45) Date of Patent: Feb. 7, 2006

(54) BOILERLESS STEAMER APPARATUS AND METHOD TO REDUCE WATER USEAGE

(75) Inventors: Michael Gibson Parsons, Brandon, MS (US); Roger R. Moore, Jr., Brandon, MS (US); Pedro Hilarion Lopez, Brandon, MS (US)

(73) Assignee: Delaware Capital Formation, Inc., Wilmington, DE (US)

( * ) Notice: Subject to any disclaimer, the term of this patent is extended or adjusted under 35 U.S.C. 154(b) by 56 days.

(21) Appl. No.: 10/849,583

(22) Filed: May 20, 2004

Related U.S. Application Data

(63) Continuation-in-part of application No. 10/439,604, filed on May 16, 2003.

(51) Int. Cl.
*A01G 13/06* (2006.01)

(52) U.S. Cl. ............... 392/386; 392/398; 392/399; 392/405; 99/330; 99/417; 165/236

(58) Field of Classification Search .............. 392/324, 392/392, 386, 394, 396, 397, 398, 399, 403, 392/404, 405, 406, 395, 401; 99/517, 417, 99/476, 330, 331; 126/20, 20.1, 378, 600, 126/20.2; 165/162, 236; 219/401
See application file for complete search history.

(56) References Cited

U.S. PATENT DOCUMENTS

| 1,985,546 | A | * | 12/1934 | Nosarzewski | 392/396 |
|---|---|---|---|---|---|
| 3,604,895 | A | | 9/1971 | MacKay | 219/401 |
| 4,343,292 | A | | 8/1982 | Kells et al. | 126/378 |
| 4,410,030 | A | * | 10/1983 | Skala | 165/236 |
| 4,436,082 | A | * | 3/1984 | Hiller et al. | 126/348 |
| 4,491,146 | A | | 1/1985 | Sveds | 137/341 |
| 4,648,382 | A | | 3/1987 | Greenbacker | 126/348 |
| 4,650,968 | A | | 3/1987 | Williams | 219/401 |
| 4,982,656 | A | | 1/1991 | Stone | 99/403 |
| 5,103,800 | A | | 4/1992 | Bedford et al. | 126/20 |
| 5,161,518 | A | | 11/1992 | Bedford | 126/348 |
| 5,167,216 | A | | 12/1992 | Yeung et al. | 126/349 |
| 5,368,008 | A | | 11/1994 | Oslin | 126/20.2 |
| 5,388,180 | A | * | 2/1995 | Bayles | 392/484 |
| 5,441,034 | A | | 8/1995 | Bedford et al. | 126/20 |
| 5,524,608 | A | | 6/1996 | Yeung et al. | 126/391 |
| 5,640,946 | A | * | 6/1997 | Oslin | 126/20 |

(Continued)

OTHER PUBLICATIONS

StellarSteam "Sirius Circulating Convection Gast Steamer".

(Continued)

*Primary Examiner*—Robin O. Evans
*Assistant Examiner*—Leonid Fastovsky
(74) *Attorney, Agent, or Firm*—Butler, Snow, O'Mara, Stevens & Cannada PPLC

(57) ABSTRACT

A boilerless steamer apparatus is provided having a steamer cavity formed of a steam generating space and a cooking space, wherein the steam generating space is separated from the cooking space by a removable steam lid. The present boilerless steamer apparatus can provide between 7 to 10 lbs./hour (per pan) of steam. Additionally, various means are disclosed to reduce the amount of condensate reaching the drainage system. Various methods to easily clean the boilerless steamer apparatus are provided.

8 Claims, 14 Drawing Sheets

U.S. PATENT DOCUMENTS

| | | |
|---|---|---|
| 5,968,388 A | 10/1999 | Creamer ..................... 219/401 |
| 5,968,574 A | 10/1999 | Sann ......................... 426/510 |
| 6,310,325 B1 | 10/2001 | Colburn ...................... 219/401 |
| 6,453,802 B1 | 9/2002 | Manganiello et al. ......... 99/330 |
| 6,619,189 B1 * | 9/2003 | Tippmann et al. ............ 99/330 |
| 6,833,534 B2 | 12/2004 | Bellassai et al. |
| 6,909,070 B2 * | 6/2005 | Veltrop et al. .............. 219/401 |
| 2001/0046380 A1 | 11/2001 | LeFebvre, Jr. .............. 392/501 |
| 2002/0038760 A1 | 4/2002 | Salmisuo .................... 203/10 |
| 2002/0162518 A1 | 11/2002 | Dumaz et al. |
| 2003/0047560 A1 | 3/2003 | Yamauchi et al. .......... 219/757 |
| 2004/0020374 A1 | 2/2004 | Rossi ......................... 99/410 |

OTHER PUBLICATIONS

Cleveland Range LLC. "SteamChef™3".

U.S. Appl. No. 10/439.604, filed May 16, 2003, Parsons et al.

* cited by examiner

US 6,996,334 B1

BOILERLESS STEAMER APPARATUS AND METHOD TO REDUCE WATER USEAGE

RELATED APPLICATIONS

This is a continuation in part (CIP) of U.S. Ser. No. 10/439,604 filed May 16, 2003 (hereby specifically incorporated by reference in its entirety).

STATEMENT REGARDING FEDERALLY SPONSORED RESEARCH OR DEVELOPMENT

Not Applicable

REFERENCE TO A "MICROFICHE APPENDIX"

Not Applicable

FIELD OF THE INVENTION

This invention relates to a boilerless steamer apparatus wherein a steam generator is integral to the steamer cavity and methods of cleaning; and, more specifically a boilerless steamer with reduced water usage.

BACKGROUND OF THE INVENTION

The steamer is a vital part of many commercial and institutional kitchens. Since its introduction, the bulk steamer has been the only steamer appliance capable of producing adequate steam for rapid and large volume food production. All of these bulk steamers feature a cavity for cooking food product and a separate steam generator for steam production connected via steam transmission tube. The problem with this design of a steam generation system is the formation of lime scale inside the steam generator. Many cleaning methods and different generator designs have been developed over the years; however nothing has been developed to effectively and efficiently eradicate the lime scale build up, which results in steamer down-time and costly service calls. These service calls are required to professionally clean the steam generator or replace it.

Bulk steamers with the steam generator separate from the cavity cannot be thoroughly cleaned by the user of the equipment, thus creating service calls and unnecessary down time. Connectionless steamers can be made with a steam generator which is integral to the steamer cavity. However, these connectionless steamers do not create the same amount of steam as a bulk steamer. In a connectionless steamer, the condensate forms and is then reintroduced to the boiling reservoir. A connectionless steamer does not have a condensate drain or a water trapping lid. For the end user that needs the power of the bulk steamer, the connectionless steamer is not an option, but the need for an easy to clean generator is still there.

SUMMARY OF THE INVENTION

Unlike the traditional bulk steamers, the present boilerless steamer apparatus has a steam generator which is integral to the steamer cavity thus making the steam generator easily accessible for operator cleaning. The present boilerless steamer apparatus features the cooking power of a bulk steamer with the cleaning benefits of a connectionless steamer.

The present invention provides a boilerless steamer apparatus with a steamer cavity formed by a steamer cavity wall consisting essentially of a steam generating space separated from a cooking space by a removable steam lid. The removable steam lid is spaced apart from the steam cavity wall to form a pressure differential between the cooking space and the steam generating space. The removable steam lid is formed to remove condensate from the cooking space. The present invention provides means to reduce the volume of condensate reaching the drainage system to provide more economical operation.

More specifically, this invention provides a boilerless steamer apparatus including a drainage system made of a steamer cavity formed by a steamer cavity wall consisting essentially of a steam generating space separated from a cooking space by a removable steam lid, wherein the removable steam lid is spaced apart from the steam cavity wall to form a pressure differential between the cooking space and the steam generating space. It also is made of a condensate cup adjacent to the removable steam lid, the condensate cup providing a means to remove condensate and waste from the cooking space. It also is made of a valve operably connected to the steamer cavity, the valve configured to vent steam outside of the apparatus. The apparatus also has a condensate box operably connected to the valve. The condensate box is configured to convert steam to condensate. A drain box is operably connected to the condensate box. The drain box is connected to a condensate cooling line. The function of the condensate cooling line is to cool the condensate in the drain box to less than 130° F. prior to reaching the drain.

DETAILED DESCRIPTION OF THE INVENTION

This invention relates to a boilerless steamer apparatus that produces steam at a rate similar to a bulk steamer. A bulk steamer is defined as a steamer that requires a drain connection, power connection (gas or electric) and water connection for steaming and condensate. Some connectionless type steamers have options for water fill and drain but are not necessary for the operation of the unit. The present invention produces between 7 to 10 lbs./hour per pan of steam. This invention provides water saving embodiments to provide for economical operation.

Figure 1:
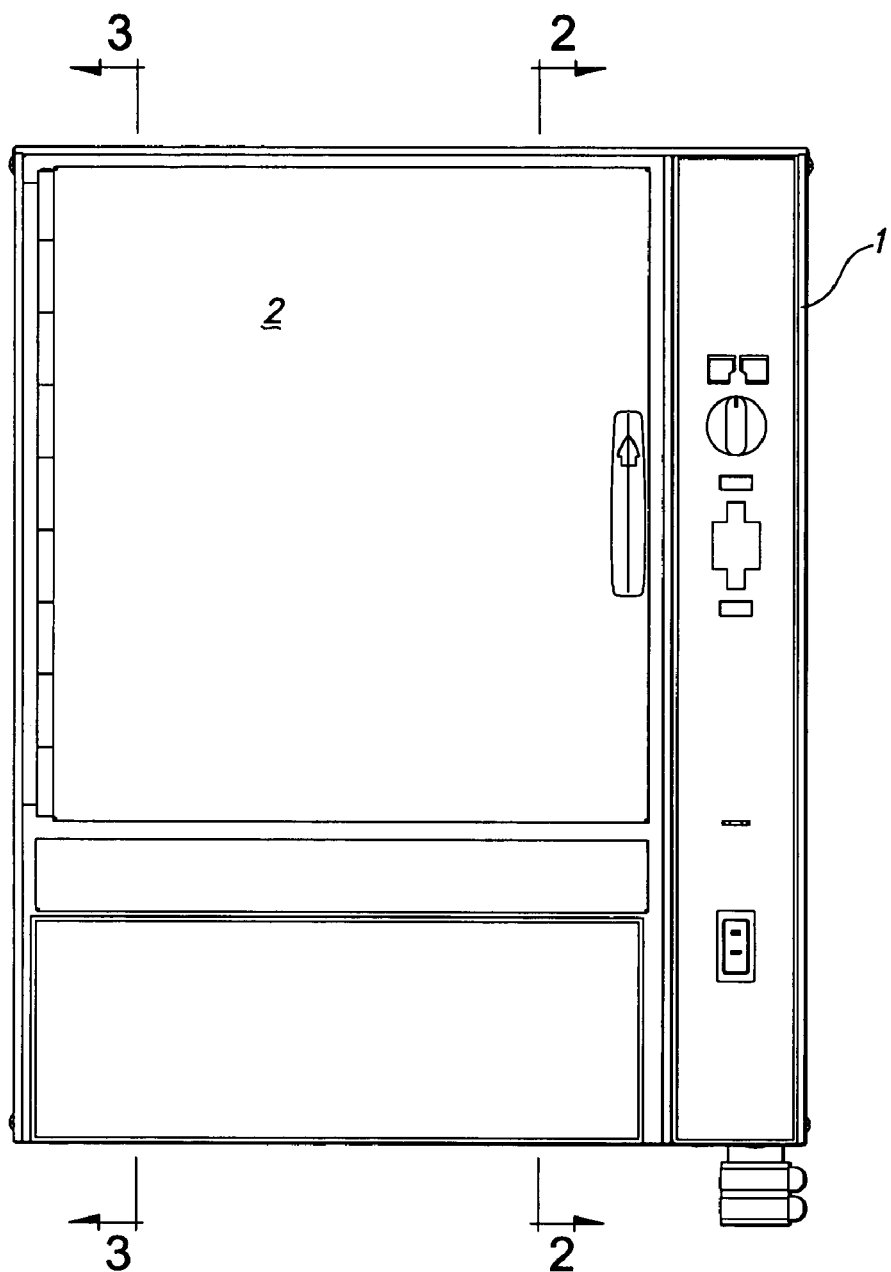
FIG. 1 is a front view of the boilerless steamer apparatus of the present invention.

FIG. 1 shows a boilerless steamer apparatus 1 of the present invention. Boilerless steamer apparatus 1 has a door 2 located at the front of the boilerless steamer apparatus 1.

Figure 2:
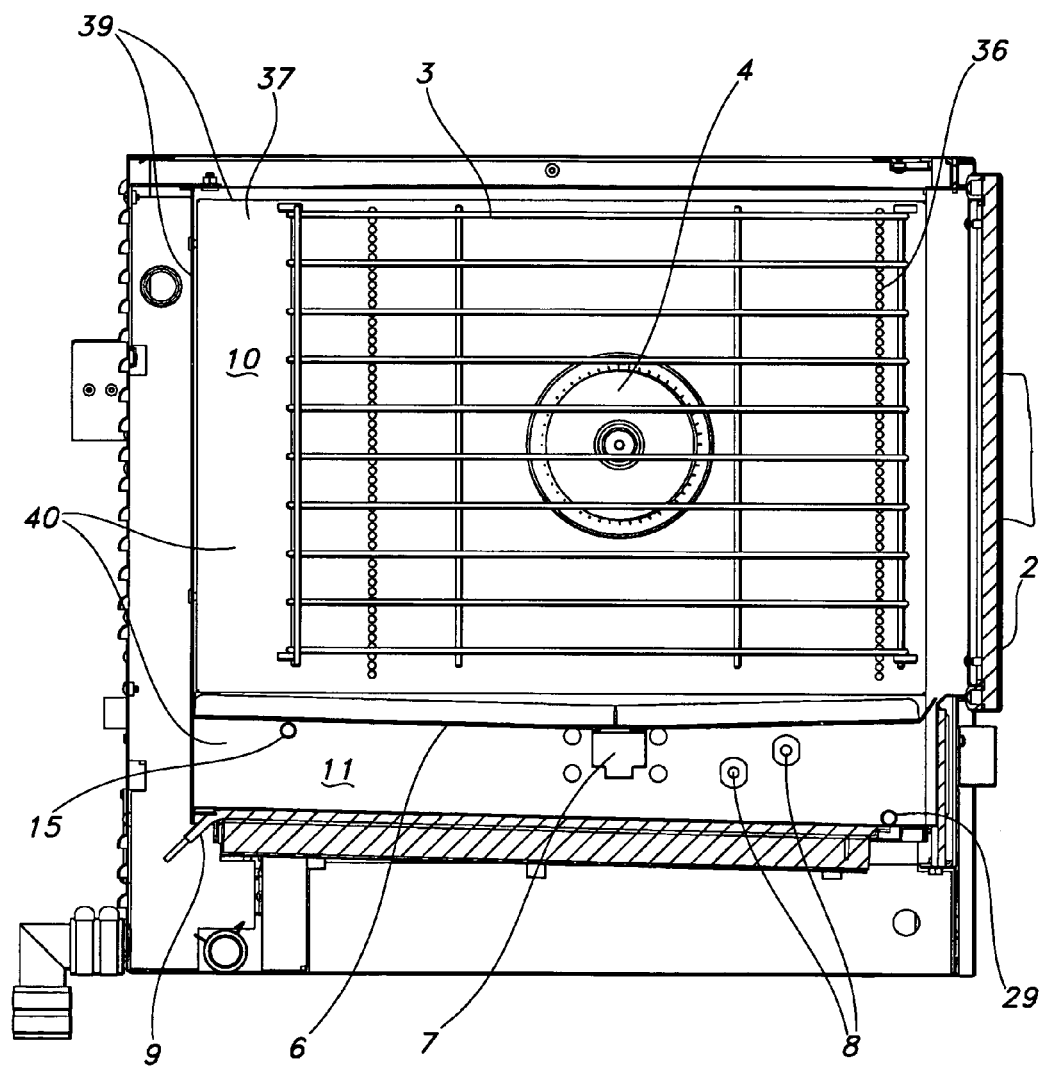
FIG. 2 is a partial side view taken along sectional line 2—2 of the boilerless steamer apparatus of FIG. 1.

FIG. 2 shows the inside view of the right side of the interior of the entire boilerless steamer apparatus 1. Door 2 is on the front of the cooking space 10. A plurality of racks 3 supports food pans, not shown, at different heights. The present invention contemplates between 3 to 10 food pans of standard height and length. Fan 4 is adjacent to sidewall and draws the steam across the food pans. The fan 4 is in the steamer cavity walls 39 opposite the inlet ports of the plurality of steam routing paths 23. The steamer cavity 40 is formed by steamer cavity walls 39. The steamer cavity 40 is made of a cooking space 10 and a steam generating space 11. The cooking space 10 is separated from steam generating space 11 by a removable steam lid 6. The steam generating space 11 includes means to generate steam and thus provide steam to boilerless steamer apparatus 1. The means to generate steam in the steam generating space 11 include a plurality of heating elements 9 or gas burners 41. The steam generating space 11 delivers between 7 to 10 lbs./hour/pan to the cooking space 10.

Removable steam lid 6 separates cooking space 10 above it from steam generating space 11 below it. The removable steam lid 6 can be made of stainless steel, such as 304 stainless steel or an NSF approved equivalent. The boilerless steamer apparatus 1 has integrated the means to generate steam into the steamer cavity 40. This design allows the operator easy access to the steam generating space 11 for cleaning lime scale and other contaminants from the heated surface 45. Access to the steam generating space 11 is provided via a removable steam lid 6.

Removable steam lid 6 has several functions. First, the removable steam lid 6 separates the cooking space 10 from the steam generating space 11. The removable steam lid 6 makes the boilerless steamer apparatus 1 much safer to operate by keeping the rapidly boiling water and the heated surface 45 of steam generating space 11 from being accidentally contacted by an operator.

Second, the space between the removable steam lid 6 and the steamer cavity walls 39 are minimized. This design allows the steam generating space 11 below the removable steam lid 6 to operate at a slightly higher pressure than the cooking space 10. This pressure differential is vital to general direction of steam flow. The higher pressure in the steam generating space 11 forces steam through a plurality of substantially vertical tube steam delivery path 23 and into the cooking space 10. Also, this dividing function minimizes the boil quench affect when cold or frozen food product is placed in the boilerless steamer apparatus 1. The cold environment of the food product does not reduce the steam production rate in the steam generating space 11.

Third, in the preferred embodiment, the steam routing from the steam generating space 11 is external of the steamer cavity 40 via the aforementioned plurality of substantially vertical tube steam delivery path 23. Routing these substantially vertical tube steam delivery paths 23 external of the steamer cavity 40 helps establish the required pressure differential. The plurality of inlet ports 17 on one side of the boilerless steamer apparatus 1 and the fan 4 on the other side, the steam entering the cooking space 10 directly impacts the food product and is drawn across the food product by the fan 4. In the preferred embodiment, there are between 2 to 4 substantially vertical tube steam delivery path 23 providing steam at various levels in the cooking space 10. The substantially vertical steam paths 23 are preferably round in diameter and between ¾ to 1½ inch I.D. The substantially vertical tube steam delivery paths 23 must be of the designated size to preferably provide between 7 lbs./hour/pan to 10 lbs./hour to the cooking space 10.

In an alternative embodiment, the steam routing path may be formed internal to the steamer cavity walls 39 such as by incorporating the pathway, into the interior sheet metal of steamer cavity 40.

Fourth, the removable steam lid 6 catches most of the steam condensate and food product spills. Keeping the condensate and food spills from entering the steam generator space 11 reduces the contamination of the water 34. Many contaminants cause the boiling water to foam and transfer flavors between food products.

The plurality of heating elements 9 provides heat to generate steam. Water level sensors 8 detect high and low operational water levels. Condensate cup 7 collects most condensed steam from the cooking process. The condensate cup 7 is a means to remove condensate from the cooking space. Overflow tube 15 reduces water from spilling out of boilerless steamer apparatus 1.

The function of the condensate cup 7 to receive the condensate and food spills from the removable steam lid 6. The condensate cup 7 and related drainage tubes provide a means to remove most condensation from the cooking space 10. After receipt of the liquids, the condensate cup 7 ducts these fluids to an attached condensate drain tube 16 connected to the drain box 27. It is also the third leg of support for the removable steam lid 6. In the preferred embodiment, the condensate cup 7 is mounted on the vertical wall along with the water level sensors 8.

Water level is maintained by the water level sensors 8. If the water level sensors 8 fail then maximum water level is controlled by overflow tube 15. Water level inside the steam generating space 11 is detected by two water level sensors 8. The upper probe provides water level information to the control board so that normal operating water level is maintained. The lower probe serves as a safety device. When this lower probe does not sense the presence of water in the steam generator, the water level board will disable the steamer and notify the user that service is required.

If the steam generating space 11 needs to be drained for cleaning then water can be drained via cavity drain 29. Power and control components are secured to two electrical panel assemblies: high voltage panel assembly 46 and low voltage panel assembly 47.

Figure 3:
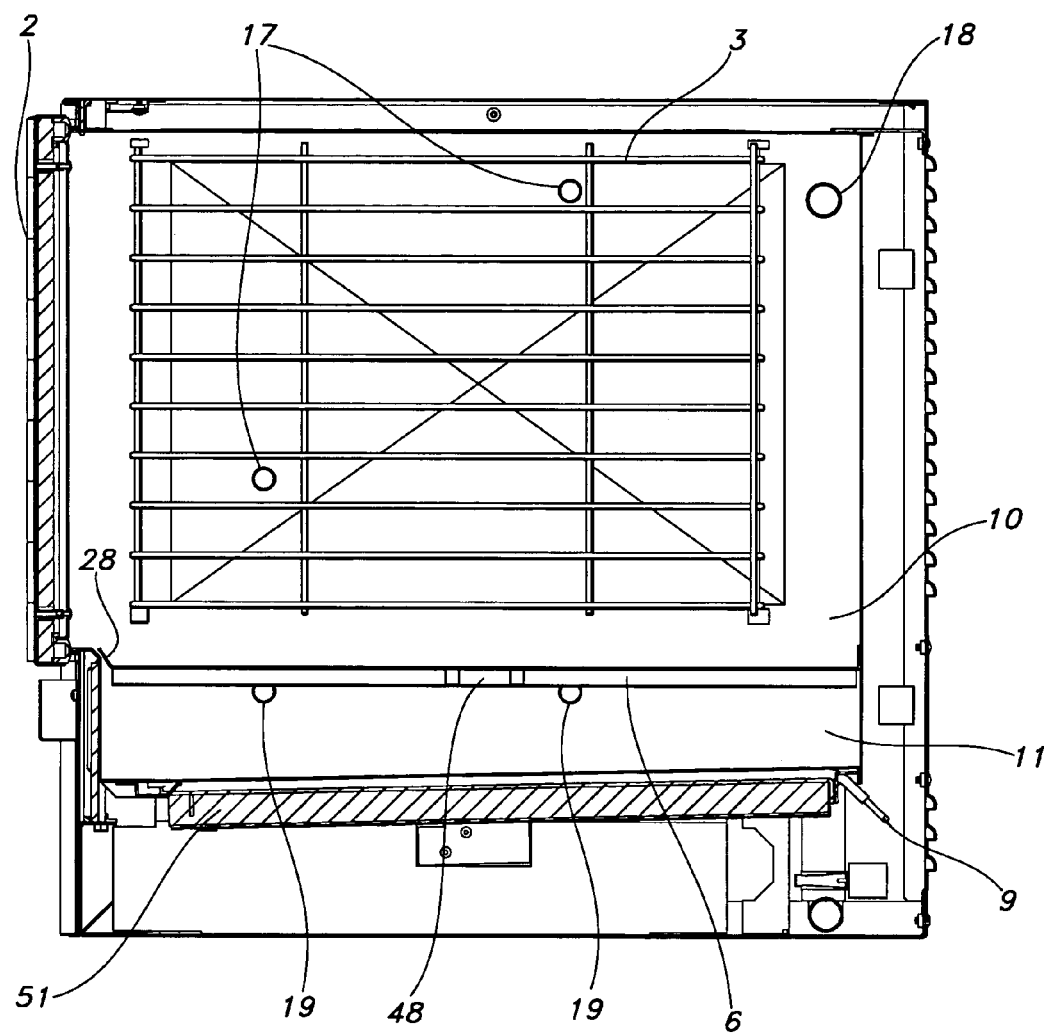
FIG. 3 is a partial side view taken along section line 3—3 of the boilerless steamer apparatus of FIG. 1.

FIG. 3 shows the inside view of the left side of the interior of the entire boilerless steamer apparatus 1. A plurality of steam ports 19 allow steam from steam generating space 11 into cooking space 10 at various levels through a plurality of inlet ports 17. Steam cooking cavity vent port 18 admits spent steam to drain box 27. The boilerless steamer apparatus 1 is connected to drain box 27, and hence the drain during operation. The function of the drain box 27 is to hold condensate until it is drained. The drain box 27 is configured to retain condensate until the condensate is drained.

An additional safety feature of the boilerless steamer apparatus 1 is a magnet 48 attached to the removable steam lid 6. When the removable steam lid 6 is properly installed, a magnetic switch 49 senses the magnetic field from magnet 48 attached to removable steam lid 6, sends a signal to the control board and allows the steamer to apply power to the heating elements 9 or infrared burners 41. The proper installation of the removable steam lid 6 is necessary so that the steam generating space 11 operates at the proper pressure. Also, the removable steam lid 6 keeps a user from reaching into the cavity and coming in contact with the boiling water in the steam generating space 11.

Figure 4:
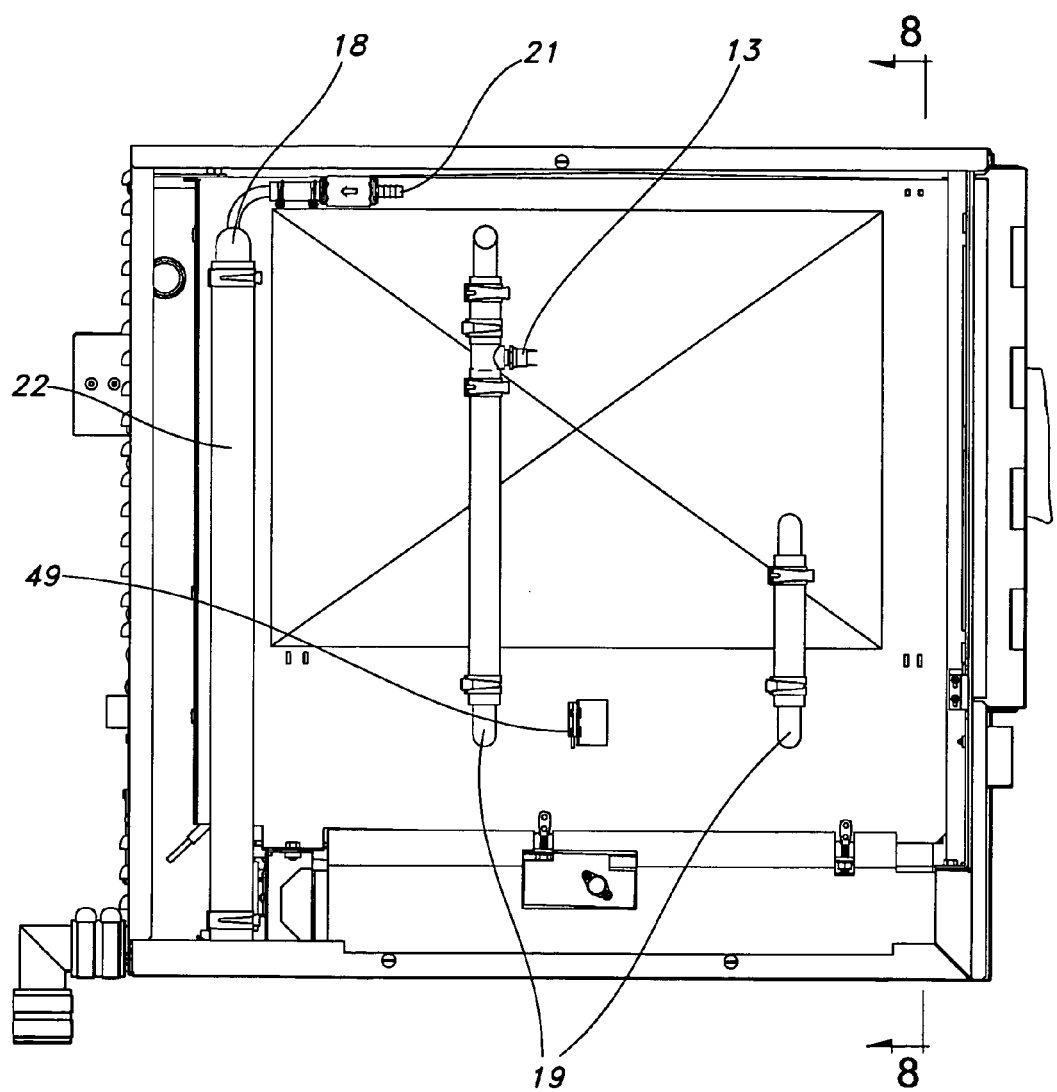
FIG. 4 is a view of the left side of the boilerless steamer apparatus of FIG. 1 with the outer cover removed.

FIG. 4 shows a view of the left side of the boilerless steamer apparatus 1 with the outer cover and insulation removed. A plurality of steam ports 19 connect with substantially vertical tube steam delivery paths 23 outside the steam generating space 11. Substantially vertical tube steam delivery paths 23 further connects the plurality of inlet ports 17 are positioned to deliver steam to the cooking space 10 at various levels. Steam vents through steam cooking cavity vent port 18 into substantially vertical steam vent path 22 which in turn connects to the drain tube assembly 25. Vacuum breaker 21 prevents collapse of the steamer cavity 40 during cool water refill or rapid door closing.

Figure 5:
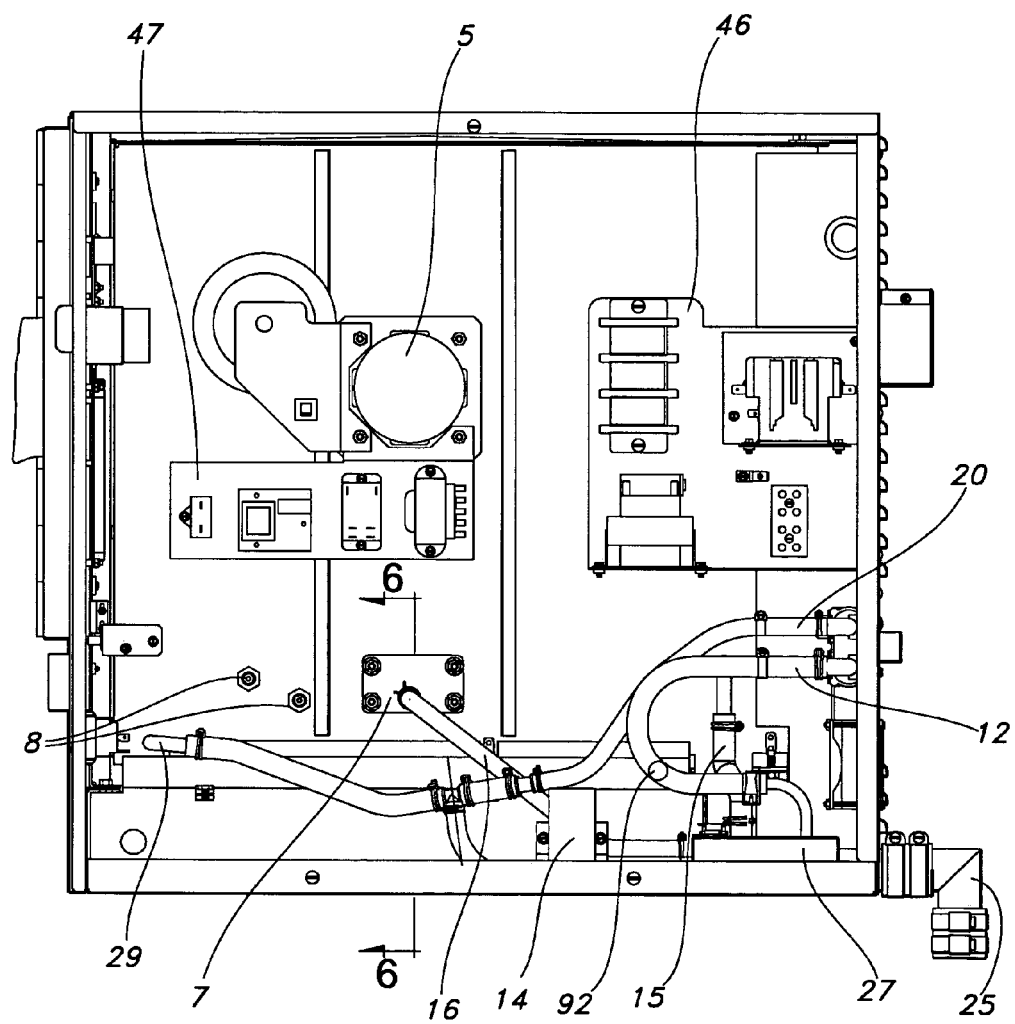
FIG. 5 is a view of the right side of the boilerless steamer apparatus of FIG. 1 with the outer cover removed.

FIG. 5 shows a view of the right side with the outer cover and insulation removed. Refill water enters the steam generating space 11 through cavity drain 29. Cooking juices and condensed steam drain onto removable steam lid 6 and collect in condensate cup 7, pass through connecting line 16 and into drain box 27. Fluids exit the boilerless steamer apparatus 1 through drain tube assembly 25. Fresh water enters the steam generating space 11 through water inlet tube 20 during operation. This fresh water is piped through the cavity drain 29 in order to automatically remove debris which may obstruct the cavity drain. Additionally, cool water is added to the condensate cooling line 12 to cool the drain box 27. This condensate cooling line 12 uses a substantial amount of water. An orifice 92 can be installed on to the condensate cooling line 12 to control the flow of water to the drain box 27.

Figure 6:
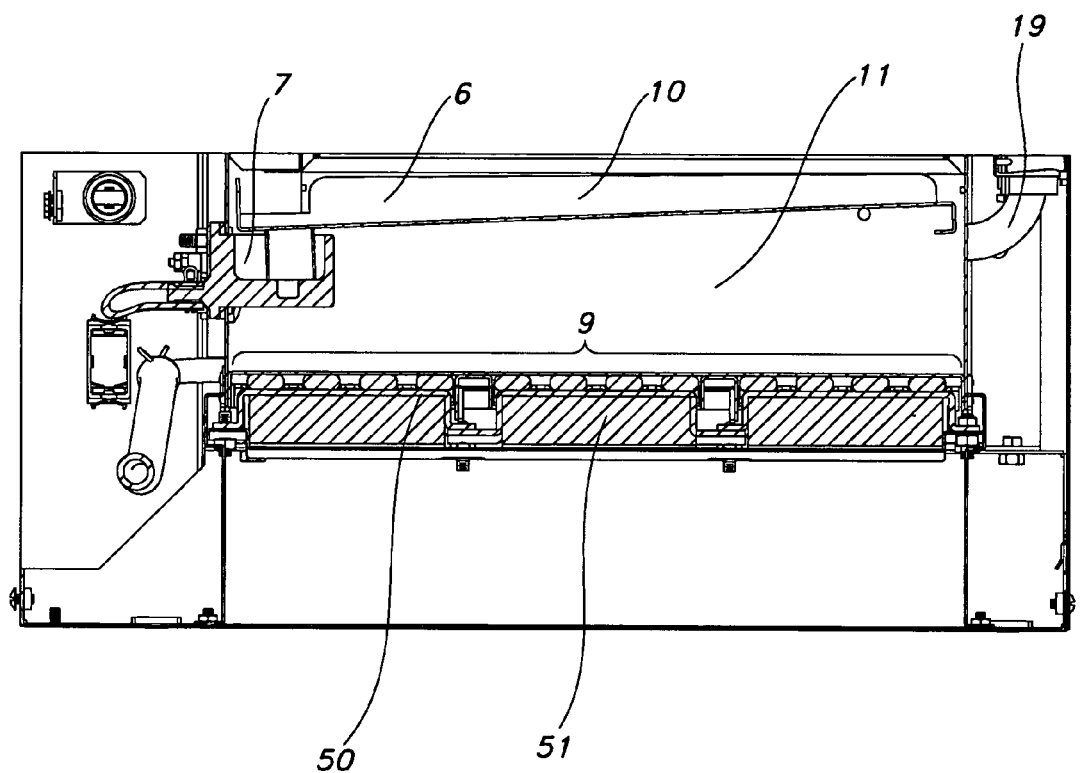
FIG. 6 is a partial rear view taken along section 6—6 of FIG. 5.

FIG. 6 shows a section view from the rear. A plurality of heating elements 9 cause water to boil in steam generating space 11. The heating elements 9 are nonsubmerged. Steam passes through a plurality of steam ports 19 up into the cooking space 10. Removable steam lid 6 directs condensate drips into condensate cup 7. The plurality of heating elements 9 shown in FIG. 6 forms multiple, low watt density heater strips. The quantity of heating elements can vary from 3 to 24 depending on the steamer cavity 40 size and power required.

By using multiple elements, the watt density of each heating element 9 is reduced thus extending the life of each element. If a heating element from the plurality of heating elements 9 need to be replaced then only the bad element is replaced. Also, to facilitate the low watt density element, the cavity chamber has been extended significantly. Most steamer cavities are shaped to hold only the size of the pan. A feature of the boilerless steamer apparatus is the steamer cavity has been increased by about 25% to give the elements area to heat. This improves the thermal inertia of the cooking space 10. The extra volume allows the water reservoir to be large which in turn minimizes the quench effect during the addition of water. The heat transfer area has to be large to execute a boilerless gas and electric unit. In this invention, the steamer cavity is shaped to accommodate a sufficient number of electric heating elements to provide an element watt density of less than 35 watts per sq. inch. Similarly, the steamer cavity of this invention is shaped to accommodate a sufficient number of gas burners to provide between 48,000–105,000 BTU/hour.

Figure 7:
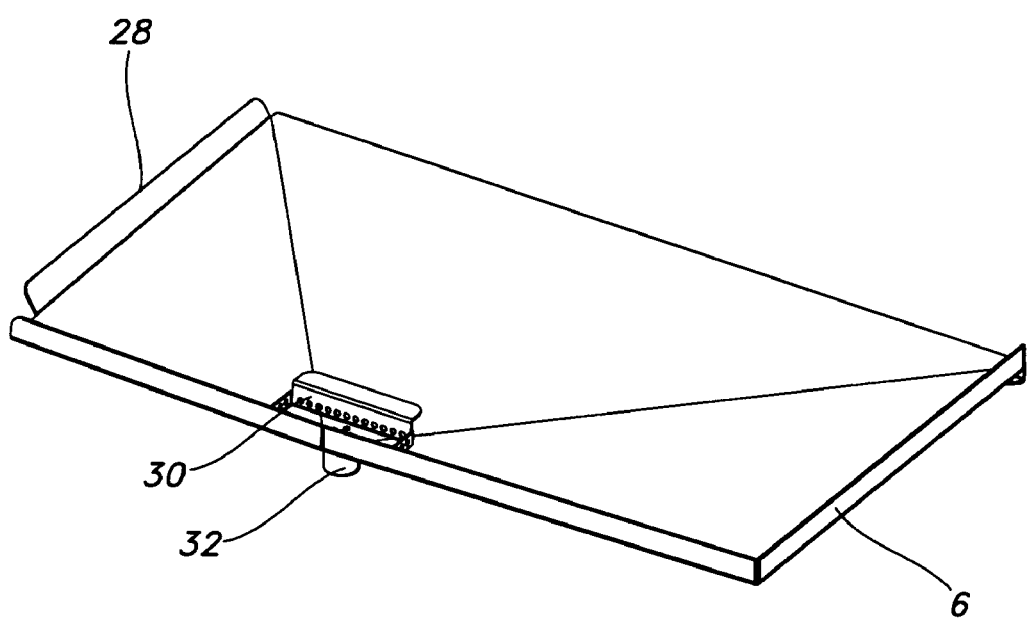
FIG. 7 is an isometric view of the steamer lid which separates the steam cooking cavity from the steam generating cavity.

FIG. 7 illustrates removable steam lid 6 with drain tube 32, which inserts into condensate cup 7. The removable steam lid 6 has holes 30 to prevent debris from clogging drain tube 32 of removable steam lid 6 and drainage system down stream. The removable steam lid 6 in one embodiment is a formed piece of sheet metal with a shallow valley slope down to drain tube 32. A screen 30 can be used to restrict debris from clogging drain tube 32. Edge 28 facilitates cleaning in place by allowing a user to wipe out food particles and other unwanted debris.

Figure 8:
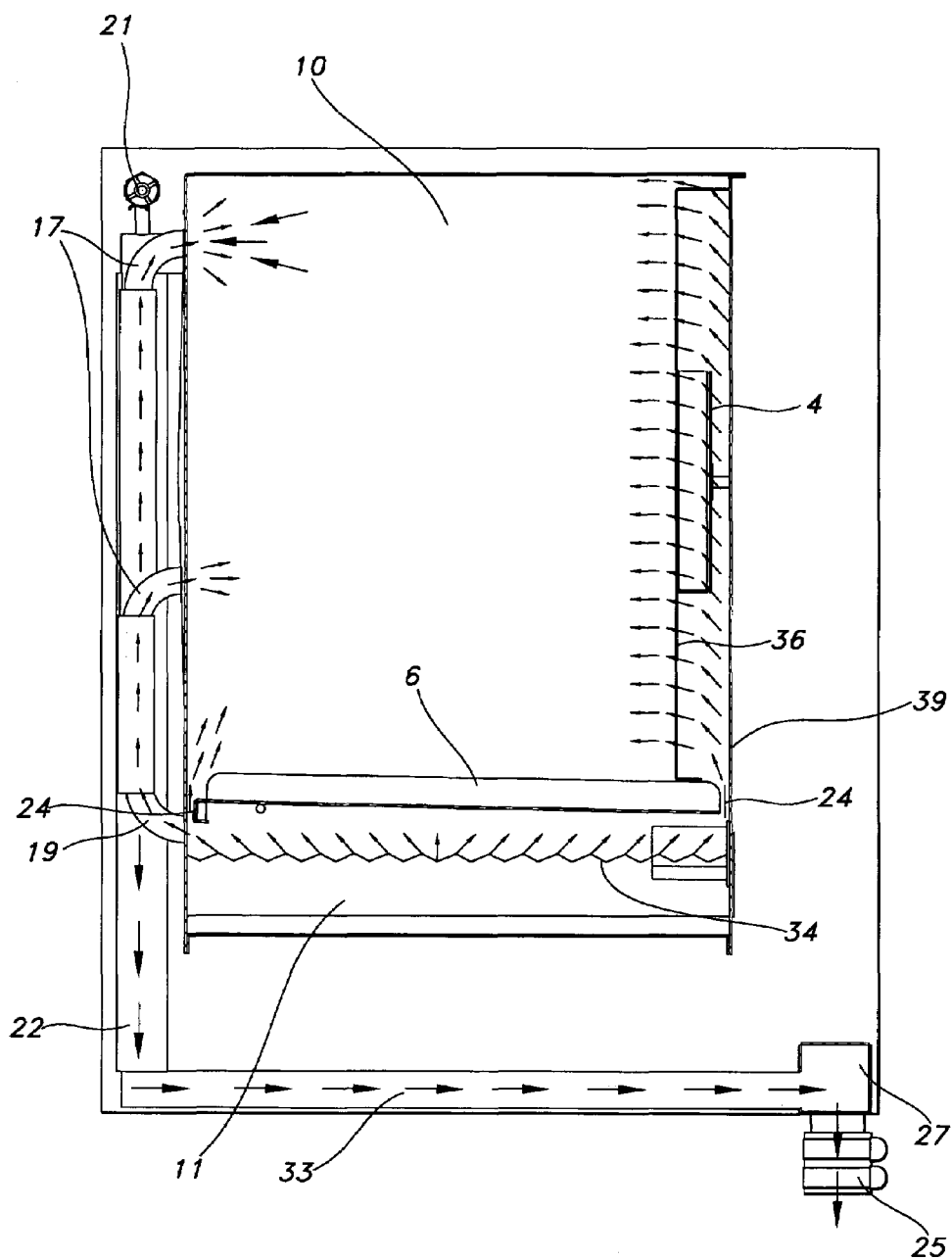
FIG. 8 is a partial front view taken along section line 8—8 of FIG. 4 showing steam and vent flow paths.

FIG. 8 is a frontal section view showing steam movement. Steam leaves the water 34 in steam generating space 11 and travels partly into plurality of steam ports 19 and plurality of ports 36 in shroud 37. Shroud 37 protects fan 4, supports plurality of racks 3, and contains a plurality of steam ports 36. Vented steam in substantially vertical vent path 22 connects with drain box 27 through substantially horizontal vent path 33. A gap 24 between removable steam lid 6 and steamer cavity walls 39 of the steamer cavity 40 are preferably between 0.125 inch–0.5 inch. This gap 24 facilitates the creation of a differential in pressure between cooking space 10 and steam generating space 11. This pressure differential is between 0.05 to 0.15 psi. This pressure differential causes steam to flow via the substantially vertical steam delivery path 23 to cooking space 10.

Figure 9:
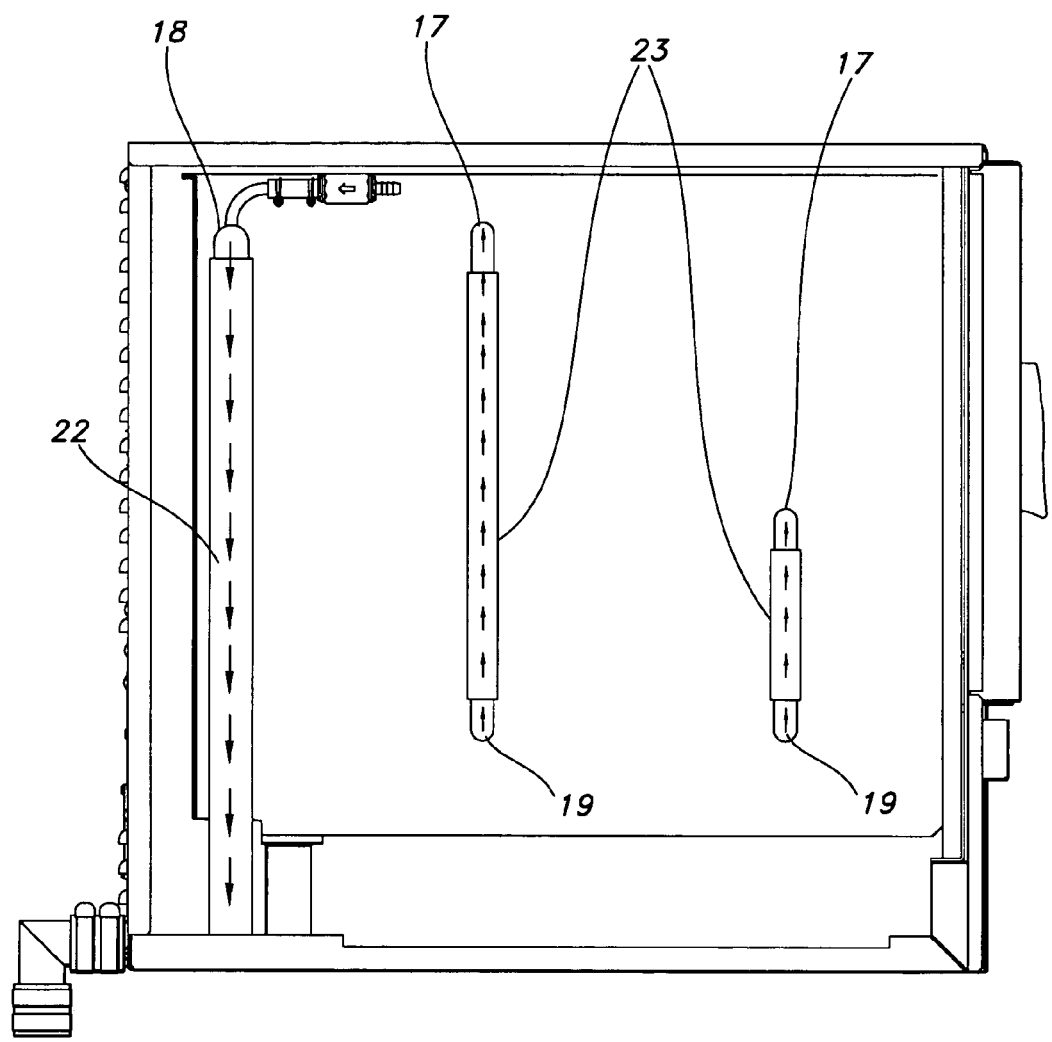
FIG. 9 is a view of the left side of FIG. 4 showing steam and vent flow paths.

FIG. 9 is a right side view showing steam flowing up from plurality of steam ports 19. Substantially vertical tube steam delivery paths 23 into plurality of inlet ports 17. Vented steam flows through steam cooking cavity vent port 18 and down substantially vertical vent path 22 to the drainage system.

Figure 10:
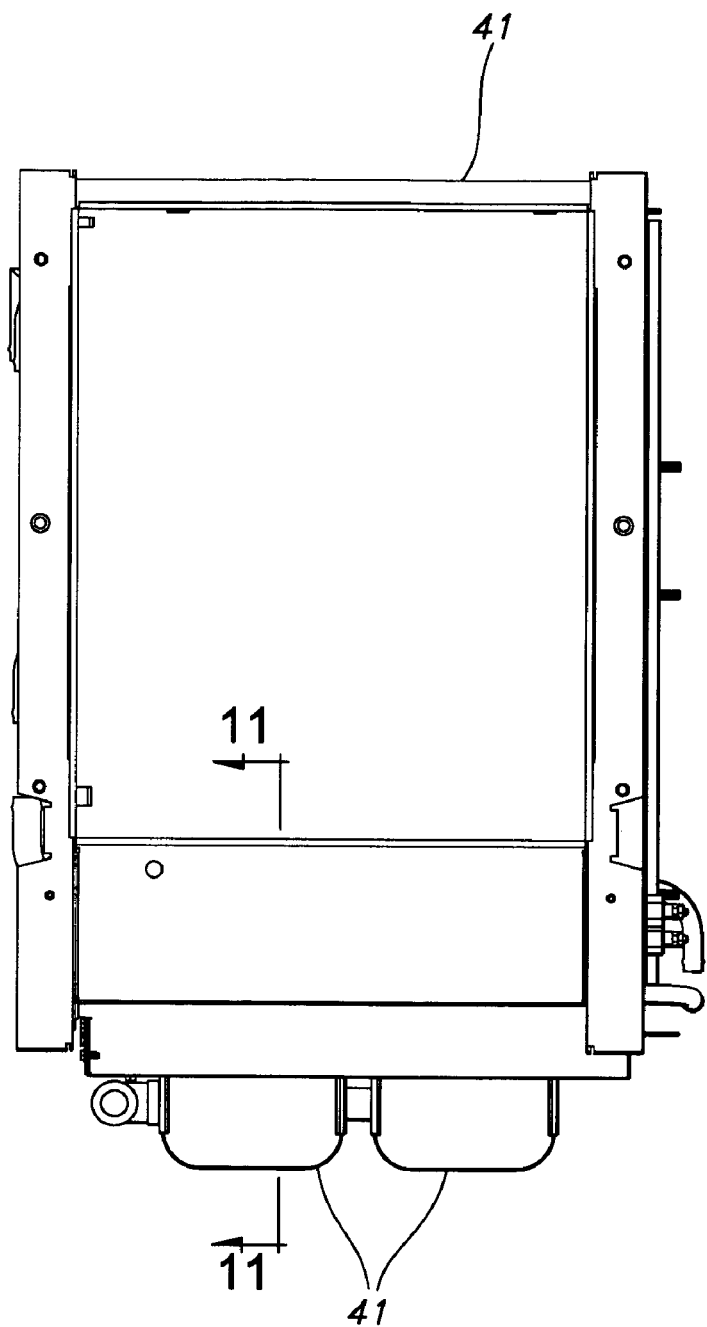
FIG. 10 is a front view of an isolated steam chamber of an alternative embodiment substituting gas burners for electric resistance heating element.

FIG. 10 shows a frontal view of steamer cavity 40 of combined steam generating and cooking chamber of alternate embodiment using infrared burners 41.

Figure 11:
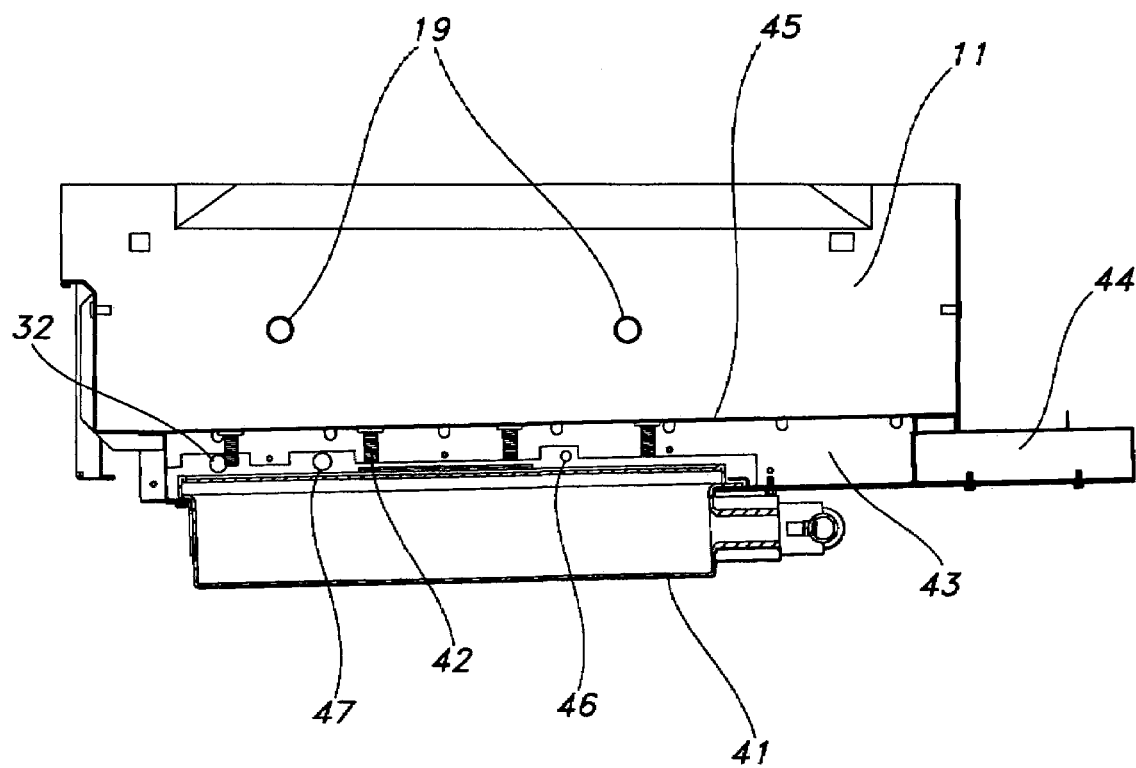
FIG. 11 is a partial side view taken along section line 11—11 of FIG. 10.

FIG. 11 shows a sectional view of the gas burners of an alternate embodiment. Combustion chamber 43 vents to exhaust flue 44. Radiant heat generated by the burners warms conduction studs 42 which in turn help conduct heat into steam generating space 11.

FIG. 10 is a front view of an isolated steam chamber of an alternate embodiment substituting gas burners for electronic resistance heating element.

FIG. 11 is a partial side view taken along section line 11—11 of FIG. 10. In the gas embodiment of the boilerless steamer apparatus 1 creates steam using infrared burners 41 and combustion chamber 43. The infrared burners 41 use all three methods of heat transfer (convection, conduction and radiation) to heat the water in the steamer base 45. Convective heat transfer is achieved by a bed of flame originating from the surface of the burners. These hot gases impinge on the steamer base 45 which in turn heats the water. Conductive heat transfer occurs when the burners 41 heats the cavity base studs 42 which conduct this absorbed heat to the steamer base 45. Radiation is the most significant mode of heat transfer from the burners to the steamer base 45. Infrared radiation is produced by the burner flames heating the ceramic burners face causing them to glow and heat the steamer base 45.

The burners 41 are started by gas flow and a hot surface igniter. Ignition is proven by a flame sensor 46. If flame is not detected by the flame sensor 46, then the gas supply is ceased as a safety precaution. The addition of a view port 47 aids service personnel in determining the presence of flame. Hot gases are removed from the combustion chamber by an attached horizontal flue 44. A vertical flue (not shown) is attached to this horizontal flue 44 to direct the hot gases upward and to a required exhaust hood, (not shown).

In an alternative embodiment shown in FIGS. 5, 12–14, a valve 90 is operably associated with the substantially vertical vent path 22. The term "operably associated" means the valve is in the substantially vertical vent path 22 or in tubing connected to said substantially vertical vent path 22. The valve is operably connected to the steamer cavity, in that the valve 90 vents the spent steam from the steamer cavity to the outside of the apparatus while allowing condensate to flow to the condensate box 27. Additionally, an orifice 92 of between 0.016 to 0.021 diameters is installed in the condensate cooling line 12 to reduce the flow of cooling water to the drain box 27. The valve 90 allows the condensate to go to the condensate box 95 and condensate cooling line 12 provides water to cool the condensate reaching the drain box 27. In this way, as the steam is vented outside through valve 90, then an orifice 92 can be installed in the condensate cooling line 12, to reduce the volume of water required in the drain box 27 to cool condensate.

Figure 12:
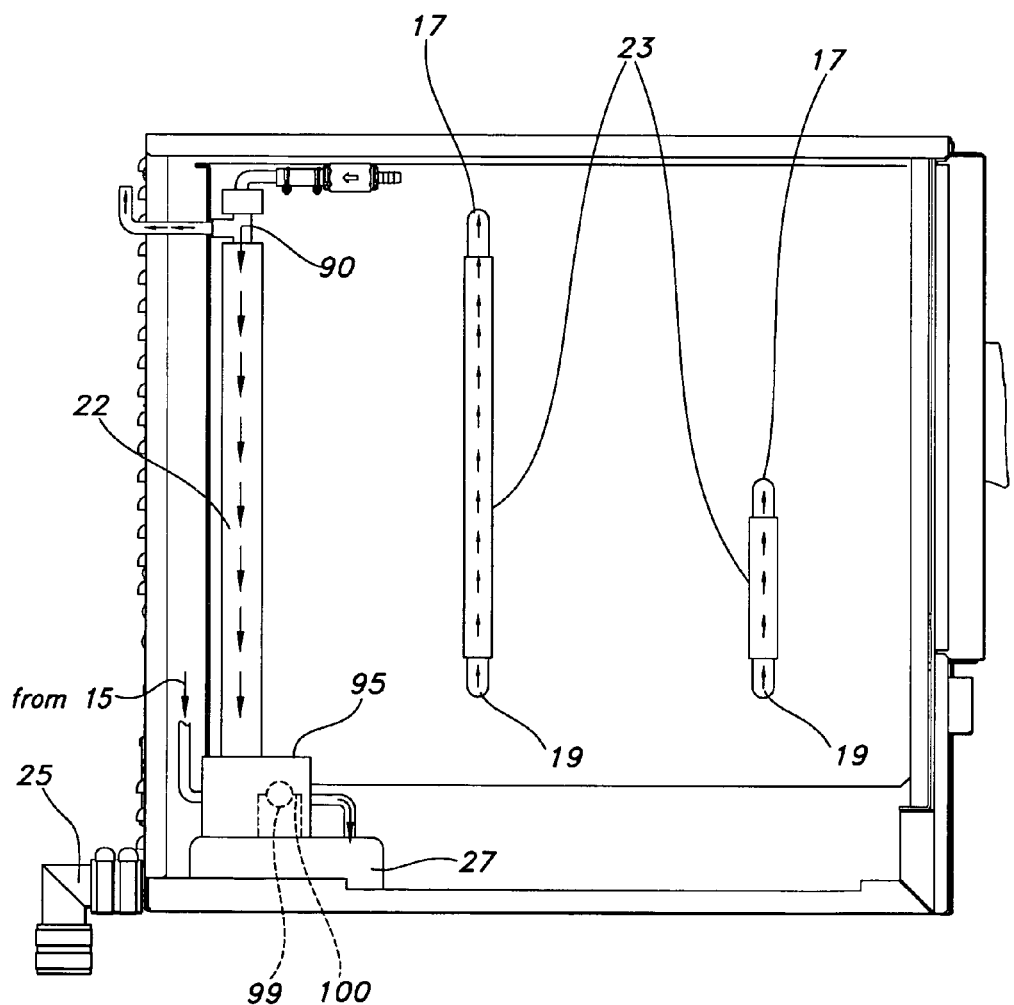
FIG. 12 is a side view of an alternate embodiment.

In an alternative embodiment shown in FIG. 12, a condensate box 95 is operably connected to drain box 27. The substantially vertical steam vent path 22 (containing valve 90) and overflow tube 15 are operably connects to the condensate box 95. Any steam not vented through valve 90 enters the condensate box 95. The function of the condensate box 95 is to separate condensate from steam prior to reaching the drain box 27. The condensate box 95 is configured to allow latent heat contained in the steam to be released within the relatively cool condensate box 95 and condense to water. In the embodiment shown in FIG. 12, a check valve 99 prevents steam from escaping the condensate box 95 while allowing liquid to condensate to collect. When condensate level within the condensate box 95 rises sufficiently high, the check valve 99 floats off its tubular valve seat 100 and allows steam back pressure to push the condensate out of the condensate box 95 and into drain box 27. In the preferred embodiment, the check valve 99 is a hollow sphere made of polypropylene and it has a diameter slightly larger than the tubular valve seat 100. The condensate box 95 is made of stainless steel and all joints are sealed for maximum efficiency.

Figure 13:
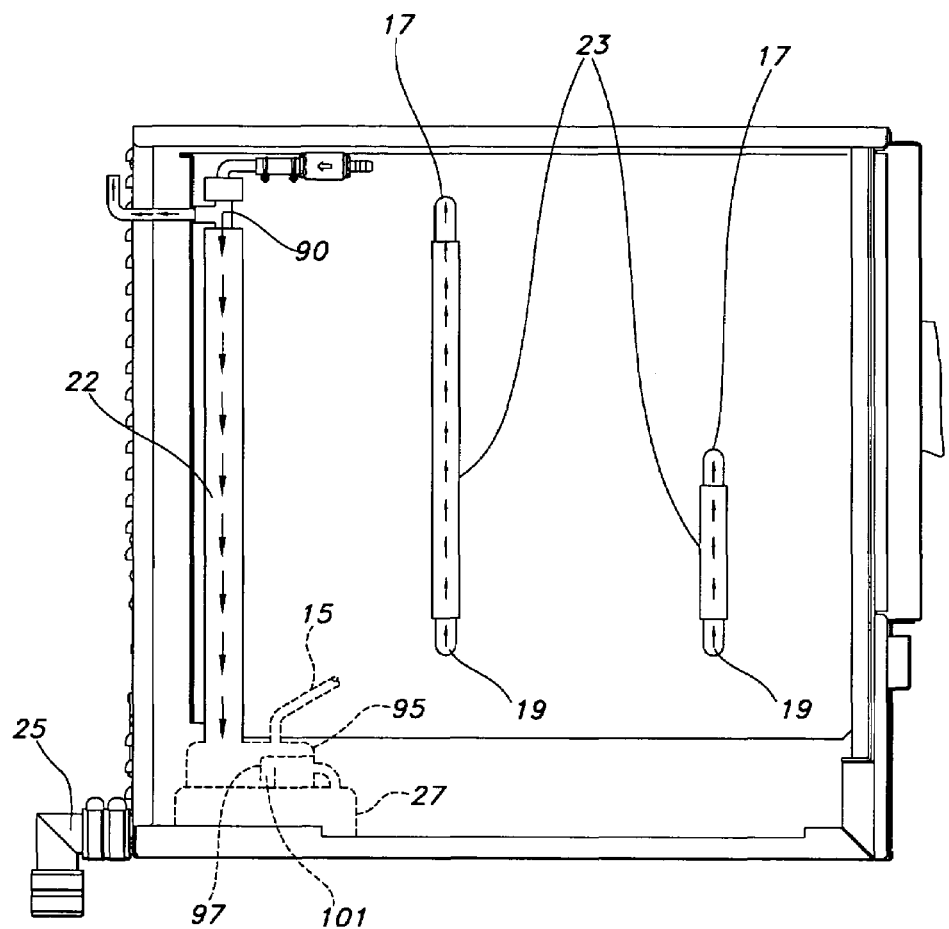
FIG. 13 is a side view of an alternate embodiment.

Now referring to FIG. 13, another embodiment of the condensate box configuration is shown. A baffle 97 is a smaller box within the condensate box 95 which contains a slit or gap 101 to allow the condensate to flow. The slot or gap 101 is about 0.070" wide by 0.750" long and make take other forms then a slot, such as a circular or triangular hole. Most of the steam entering the condensate box 95 condenses to water before exiting the baffle 97. The water flows into drain box 27. In this way, the water in the drain box 27 is less than 130° F. and has relatively little chance to flash back to steam in the drain line.

Figure 14:
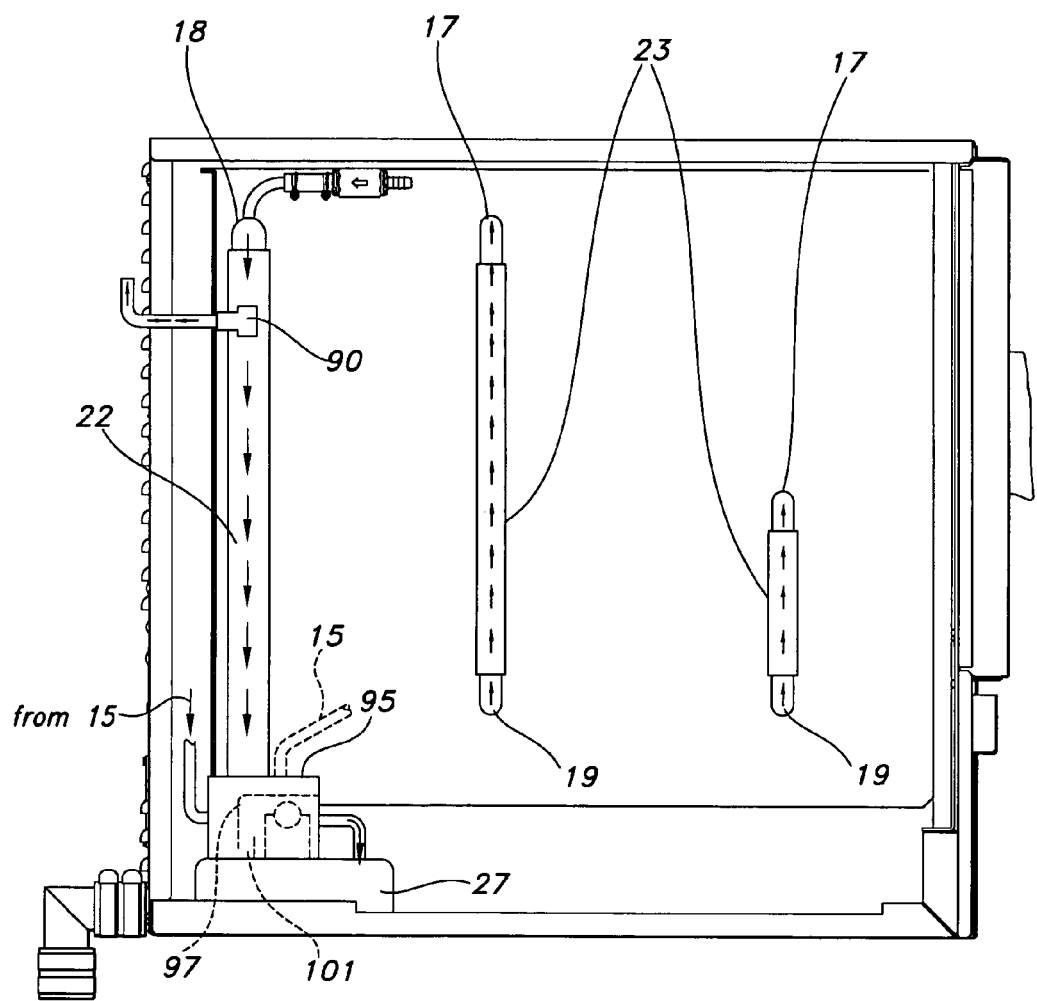
FIG. 14 is a side view of an alternate embodiment.

In FIG. 14, the baffle 97 is formed around the check valve 99 and tubular valve seat 100. The baffle 97 has a slot 101 sized to allow water to move freely into the baffle 97. The function of the baffle 97 is to keep the check valve 99 from moving away from the tubular valve seat 100.

EXAMPLE 1

Method of Operation

After heat is applied and the boilerless steamer apparatus 1 reaches cooking temperature, steam ready sensor 13 indicates to the steamer control to illuminate a "READY" light located on the front control panel. This "READY" light tells the user that the steamer cavity 40 is at a suitable temperature to begin cooking.

The steam generating space 11 is drained at shut-down through the cavity drain 29 which piped to a drain valve 14 connected to the drain box 27 and finally plumbed to a waste drain via drain tube assembly 25. Waste water requires cooling to comply with many plumbing codes, therefore tube 12 provides cooling water to the drain box 27.

The condensate cup 7 serves to remove condensate and food spills which are caught by the boilerless steamer apparatus 1. These waste fluids travel through a condensate drain tube 16 to the drain box 27.

The plurality of substantially vertical steam delivery paths 23 contains a steam ready sensor 13. Vented steam is removed from the boilerless steamer apparatus 1 by a substantially vertical tube steam vent path 22 and horizontal vent tube 33. This vent tube system is connected to the drain box 27.

Steamer cavity 40 pressure is controlled by a vacuum breaker 21 and an overflow tube 15. The vacuum breaker 21 prevents the steam cavity from implosion due to negative pressure when cool refill water enters the cavity or when the door is closed rapidly. The overflow tube 15 also serves to keep the steamer cavity 40 pressure between 0 and 1 psi and drain excess water to the drain box 27.

Fresh water enters the steam generating space 11 through water inlet tube 20. This fresh water is piped through the cavity drain 29 in order to automatically remove debris which may obstruct the cavity drain 29.

Power and control components are secured to two electrical panel assemblies: high voltage panel assembly 46 and low voltage panel assembly 47. Water level inside the steam generating space 11 is detected by two water level sensors 8. The water level sensor 8 provides water level information to the control board so that normal operating water level is maintained. The water level sensor 8 serves as a safety device. When this water level sensor 8 does not sense the presence of water in the steam generating space 11, the water level board will disable the steamer and notify the user that service is required.

The boilerless steamer apparatus 1 features three methods for cooking duration control. One is "constant on" mode. In this mode, the operator places food product in the steamer and presses this constant on button. The boilerless steamer apparatus 1 constant on feature will steam at full capacity until this mode is cancelled, a different mode is selected or the steamer is turned off. A second cooking control method is "timed" mode. In timed mode, the operator places food product in the steamer and inputs a cook time. The boilerless steamer apparatus 1 will then steam at full capacity until the input time expires and then enter a stand-by mode until this mode is cancelled, a different mode is selected or the boilerless steamer apparatus 1 is turned off.

The electric embodiment of the boilerless steamer apparatus 1 uses 6 to 24 heating elements 9 to produce steam. Elements are secured to the bottom of the steam generator 45 by element securing brackets 50. Thermal energy efficiency is improved by placing insulation 51 over the element and bracket assembly.

EXAMPLE 2

Steam in the first embodiment exits the steamer cavity 40 through vent cavity port 18. As shown in FIGS. 5, 12–14, a valve 90 can be installed in the substantially vertical vent path 22 to vent spent steam outside of the apparatus. Additionally, an optional condensate box 95 can be added on the vertical steam vent path 22. The condensate box 95 houses a check valve 99 which is a ball located on a seat 100 contained by a baffle 97. As the steam exists the steamer cavity 40, a portion of that steam turns to condensate. This condensate is separated from the steam by valve 90 and finally by the condensate box 95. The condensate released from the condensate box 95 then drains to the drain box 27. Additionally, the condensate cooling line 12 can include an orifice 92. In an embodiment, without a condensate box, this orifice allows 50 to 70 gph of water to flow can be added to the condensate cooling line 12 into the drain box 27. If the condensate box 95 is added, an orifice 92 of sufficient size to allow only 2 to 10 gph of water to flow into the drain box 27, is included. Thus, a substantial amount of water is saved. The above discussed water saving embodiments can save 18,816.00 gallons of water per year, which is at $0.02 per gallon, an operational savings of $2,472.96.

Although the foregoing invention has been described in some detail by way of illustration and example for purposes of clarity of understanding, it will be obvious that certain changes and modifications may be practiced within the scope of the appended claims.

We claim:

1. A boilerless steamer apparatus including a drainage system, comprising:
    (a) a steamer cavity formed by a steamer cavity wall consisting essentially of a steam generating space separated from a cooking space by a removable steam lid, wherein said removable steam lid is spaced apart from said steamer cavity wall to form a pressure differential between said cooking space and said steam generating space; and
    (b) a condensate cup adjacent to said removable steam lid, said condensate cup providing a means to remove condensate and waste from said cooking space;
    (c) a valve operably connected to said steamer cavity, said valve configured to vent steam outside of said apparatus;
    (d) a condensate box operably connected to said valve, said condensate box configured to convert steam to condensate;
    (e) a drain box operably connected to said condensate box, said drain box configured to retain condensate until said condensate is drained from said apparatus; and
    (f) a condensate cooling line connected to said drain box.

2. The boilerless steamer apparatus of claim 1 wherein said condensate cooling line includes an orifice of a sufficient diameter to provide between about 2 to 10 gallons per hour of water to said drain box.

3. The boilerless steamer apparatus of claim 1 comprising a substantially vertical vent path between said cooking space and said condensate box, wherein said valve is operably associated within said substantially vertical vent path.

4. The boilerless steamer apparatus of claim 1 wherein said condensate box includes a baffle including a slot configured to prevent steam from reaching said drain box.

5. The boilerless steamer apparatus of claim 1 wherein said condensate box includes a check valve and tubular seat configured to prevent steam from reaching said drain box.

6. The boilerless steamer apparatus of claim 1 wherein said condensate box includes a check valve and tubular seat configured to prevent steam from reaching said drain box, said check valve and tubular seat being encompassed by a baffle including a slot, said slot configured to receive condensate.

7. The boilerless steamer apparatus of claim 1 further comprising an overflow tube connected to said condensate box.

8. A method for reducing water usage in the operation of a boilerless steamer apparatus comprising:
    (a) providing a boilerless steamer of claim 1;
    (b) adjusting the diameter of an orifice in the condensate cooling line to reduce the volume of water flowing to said drain box.

* * * * *